3,644,504
TRANSFORMATION OF AROMATIC CARBOXYLIC ACID SALTS
Donald G. Kuper, Bartlesville, Okla., assignor to Phillips Petroleum Company
No Drawing. Filed Mar. 10, 1969, Ser. No. 805,892
Int. Cl. C07c 51/00, 51/52
U.S. Cl. 260—515 P
4 Claims

ABSTRACT OF THE DISCLOSURE

Increase in yield of aromatic polycarboxylic acid salts is achieved by carrying the transformation process for the formation of same in an atomsphere consisting essentially of carbon monoxide and in the presence of a small amount of water and a catalyst adjuvant of the formula ROH or ROM, wherein R is alkyl, aryl, cycloalkyl radical or combination thereof having from 1 to 15 carbon atoms therein and M is an alkali metal.

BACKGROUND OF THE INVENTION

It is known that alkali metal salts of various aromatic carboxylic acids having one or more carboxyl groups attached to the aromatic ring system can be transformed into salts of the corresponding aromatic carboxylic acid having at least one additional carboxyl group in the molecule by the thermal transformation or disproportionation of the carboxylic acid salt at elevated temperatures and pressures in an inert atmosphere.

While such a process has proven of interest to industry as a means for the production of various polycarboxylic acids, such as terephthalic acid, this process suffers from the disadvantage that the ultimate yield of desired polycarboxylic acid salt and thus the free acid product per se is low.

THE INVENTION

It is thus an object of the present invention to provide an improved process for the transformation of carboxylic acid salts.

Another object of this invention is to provide a process wherein the ultimate yield of polycarboxylic acids or salts thereof is increased.

Other aspects, objects and the several advantages of this invention will be apparent from the following specification and claims.

In accordance with the present invention I have discovered that conversion of alkali metal salts of aromatic carboxylic acids to the corresponding alkali metal salts of the corresponding aromatic polycarboxylic acid having at least one additional carboxyl group attached to the aromatic ring so as to obtain an increase in yield of the desired polycarboxylic acid salts is achieved by carrying out the conversion process in an atmosphere consisting essentially of carbon monoxide at atmospheric temperature and wherein, in addition to the conventional catalyst system, there is additionally present a catalyst adjuvant selected from those compounds of the formula ROM and ROH, wherein R is alkyl, aryl, cycloalkyl, or combinations thereof such as alkaryl, aralkyl, and the like having in the range of 1–15 carbon atoms inclusive; and M is an alkali metal and a small amount of water.

Thus, by this invention the conversion of an alkali metal aromatic carboxylate to an alkali metal aromatic polycarboxylate having at least one additional carboxyl group attached to the aromatic ring, and which can be subsequently converted to the corresponding aromatic polycarboxylic is carried out so as to obtain a yield of desired product in an amount greater than ½ mol of dicarboxylic acid per 1 mol of monocarboxylic acid by ultilizing an atmosphere consisting essentially of carbon monoxide at atmospheric temperature, a catalyst adjuvant selected from those of the formula ROM and ROH as above defined in combination with the catalyst conversion system and water.

The invention in its broader aspect comprises heating the alkali metal salts of aromatic carboxylic acids in an atmosphere consisting essentially of carbon monoxide and the presence of adjuvant containing catalyst to a temperature above about 340° C. and below the temperature at which substantial decomposition of the starting materials and reaction products takes place, under a pressure sufficient to protect the starting materials from decomposition, to introduce an additional alkali metal carboxylate group into a portion of said aromatic carboxylic acid salt.

The presently preferred embodiment of my invention consists in heating an alkali metal salt of benzoic acid under superatmospheric pressure to elevated temperatures in a substantially oxygen-free atmosphere consisting essentially of carbon monoxide at atmospheric temperature and in the presence of the modified catalyst system as herein described whereby a carboxylate group is introduced in para position to the carboxylate group present in the alkali metal benzoate to produce a substantial yield of dialkali metal terephthalate and benzene wherein the mol ratio of terephthalate to benzene is greater than 1.

In addition to the potassium, sodium, lithium, rubidium and cesium salts of benzoic acid, reactants which produce potassium, sodium, lithium, rubidium and cesium benzoates during the course of the reaction may also be used. The potassium salts are preferred.

The term "transformation" as employed herein is intended to define that process wherein a salt of an aromatic carboxylic acid of the formula $$AR—(COOM)_n$$

is heated to an elevated temperature at which there is achieved a disproportionation reaction and there is introduced at least one additional alkali metal carboxylate group into a portion of the initially present salt.

A specific representation of the conversion process of this ivention for potassium benzoate is as follows:

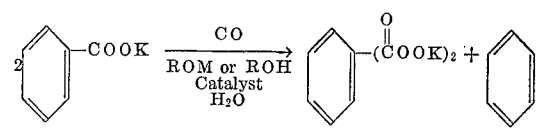

wherein M is an alkali metal such as lithium, sodium, potassium, rubidium, or cesium; and R is alkyl, cycloalkyl, arly, or combinations thereof, such as aralkyl, alkaryl, or the like, having in the range of 1 to 15 carbon atoms.

The process of this invention is carried out in an atmosphere of carbon monoxide. Such an atmosphere, however, can contain up to 50 volume percent carbon dioxide. If desired, small amounts of nonreactive inert gases can be present in the system in mixture with the carbon monoxide. Such inert gases include nitrogen, argon, and neon. As starting materials for the process of this invention, in addition to the presently preferred alkali metal salts of benzoic acid, the salts of other aromatic mono or polycarboxylic acids may be used. Such salts are those of the formula

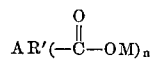

wherein AR' is an aromatic or alkyl aromatic group having 6 to 15 carbon atoms therein, M is an alkali metal and $n$ is 1, 2, or 3. Such salts are readily prepared from the corresponding acids. Such acids include, for example, benzoic acid, 2-naphthalene carboxylic acid, 4-biphenylcarboxylic acid, 2,6-naphthalenedicarboxylic acid, phthalic acid, isophthalic acid, terephthalic acid, 2-anthracenecarboxylic acid, 1,5 - anthracenedicarboxylic acid, 1,5,9-anthracenetricarboxylic acid, 3 - phenanthrenecarboxylic acid, 2,3,4-trimethylbenzenecarboxylic acid, 2,4,6-trimethylbenzene-1,3-dicarboxylic acid, 2 - ethyl-4-hexyl-6-methylbenzene-1,3-dicarboxylic acid, 2,4-dibutylbenzene-1,3,5-tricarboxylic acid and the like. In all of these carboxylic acid salts the aromatic ring may carry alkyl radicals, in addition to the carboxylate groups, provided that these substituents do not bring about a decomposition of the molecule at temperatures equal to or lower than the reaction temperature. When aromatic monocarboxylic acid salts are used as starting materials for the process according to the invention, the reaction products obtained thereby are industrially valuable alkali metal salts of the dicarboxylic acid which can be readily converted to the corresponding dicarboxylic acids such as, for example, terephthalic acid.

While the reaction may be carried out with or without transformation catalysts, however, I have found that the reaction according to the invention is favorably influenced by the presence of catalysts. Metals such as zinc, cadmium, mercury, lead and iron, as well as compounds of these metals such as their oxides and salts formed with inorganic or organic acids and their metal-organic or their complex compounds, among others, their carbonates, bicarbonates, halides, sulfates, formates, phosphates, oxalates, fatty acid salts or the salts of the above metals formed with those acids which may serve as starting materials for the reaction according to the invention or which are formed by this reaction, for example, their benzoates, phthalates or terephthalates, may be used as catalysts. The amount of catalyst used may vary within wide limits and may range from 0.1 to 100 grams of catalyst per mol of aromatic carboxylate employed, more preferably in the range of 1–50 grams per mol. The catalysts may be especially finely divided throughout the reaction mixture by transforming an aqueous solution of the salts serving as the starting materials, which contain the catalysts dissolved or suspended therein, into a dry powder by spray-drying or by other suitable methods. The above-named catalysts may also be used in conjunction with known carriers such as kieselguhr.

Preferred catalysts are, for example, iron, lead, zinc, mercury, cadmium, and their compounds, such as oxides, organic and inorganic salts, etc., although other metals and compounds may be used. Such compounds as metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate, zinc terephthalate, and other metals and compounds may be used as catalysts. The catalysts may be used as such or supported on carriers, and may be recovered from the insoluble residues of the reaction and reused in many instances without further purification.

The heating of the above defined starting materials in the presence of an atmosphere consisting essentially of carbon monoxide at atmospheric temperature is carried out under pressure. There is no upper limit for the pressure—that is, the upper pressure limit is determined only by the available apparatus. However, in general, a pressure within the range of 0–5000 p.s.i.g. is employed, more preferably in the range of 0 p.s.i.g. to 3,000 p.s.i.g.

In addition to use of the catalyst as above described and the carrying out of the reaction in an atmosphere consisting essentially of carbon monoxide, in keeping with the instant invention there should be additionally present a catalyst adjuvant of the formula ROM or ROH wherein R is an alkyl, aryl, cycloalkyl radical or combination thereof having from 1 to 15 carbon atoms therein and M is an alkali metal.

In carrying out the process of this invention the catalyst adjuvants are generally employed in an amount in the range of about 0.001 to 2.0 mols of adjuvant per mol of alkali metal aromatic carboxylate and more preferably in an amount in the range of 0.01 to 0.5 mol of adjuvant per mol of alkali metal aromatic carboxylate.

Examples of suitable catalyst adjuvants are phenol, potassium phenoxide, methanol, ethanol, 1-decanol, 3-decanol, sodium methoxide, lithium ethoxide, rubidium 1-decyloxide, cesium 3-decyloxide, sodium naphthyloxide, sodium cyclopentyloxide, potassium cyclodecyloxide, potassium 2,4-dimethylcyclopentyloxide, potassium 3-pentylcyclopentyloxide, potassium 4-cyclohexylbutyloxide, sodium benzyloxide, sodium 2 - methylphenoxide, cyclopentanol, cyclodecanol, 2-naphthalenol, benzyl alcohol, 2,4-dimethylcyclopentanol, 3-pentylcyclopentanol, 4-cyclohexylbutanol, 3-pentylcyclopentanol, 2-methylphenol, and the like.

It is preferable, according to process of this invention, that the conversion be effected in the presence of an alkali metal or alkaline earth metal carbonate. Normally, in the range of 0.1 to 100 grams of such alkali metal or alkaline earth metal carbonates are employed for each mol of alkali metal aromatic carboxylate, preferably in the range of 1 to 50 grams per mol are employed.

The process of this invention can be effected in a batchwise or continuous manner. Conventional equipment can be employed.

As previously indicated, the addition of water to the reaction system of this invention has been found to enhance the yield of desired product. Generally such added water is in the range of about 0.1 to about 6 parts of water by weight for each 100 parts of alkali metal aromatic carboxylate, preferably about 0.5 to 4 parts of water are employed for each 100 parts of alkali metal aromatic carboxylate.

Since it has been generally considered that the presence of water in the systems heretofore directed to the transformation of aromatic carboxylates are harmful and thus specific steps are generally taken to avoid the presence of same in the system, the instant concurrent and intentional addition of water in the amounts as above defined represents a significant advance in the art since the addition of the water in the instant inventive system results in the totally unexpected increase in yield of ultimate polycarboxylate product.

Generally, temperatures in the range of about 350 to 500° C. are employed, more preferably we prefer to employ temperatures in the range of about 400 to 450° C. Sufficient reaction time should be employed to effect the degree of conversion desired. Generally, reaction times in the range of about 5 minutes to about 48 hours are suitable.

The aromatic polycarboxylates which are produced according to the process of this invention can be recovered by any means known to the art. It is also within the scope of this invention to convert such aromatic polycarboxylates into the respective aromatic polycarboxylic acids and subsequently recover such acids by any means known to the art.

Thus, for example, the reaction mixture may be worked up in accordance with known methods as follows:

The reaction mixture is added to water and a solution of the soluble components is separated from the water-insoluble components. The aqueous solution is then treated with an acid to convert the metal salts of the carboxylic acid to the corresponding free carboxylic acids. The resulting free acids are thereafter separated from the solution.

In the above-described starting materials are solids, they are preferably used in dry and finely divided form and are intimately mixed with each other. In order to avoid local overheating and decomposition caused thereby, as well as to avoid caking of the reaction mixture, it is advantageous to maintain the reaction mass in motion. This may be accomplished, for example, by carrying out the reaction in vessels provided with a stirring device, in screw conveyors or in rocker or rotary autoclaves. However, uniform heating may also be effected by distributing the starting materials in thin layers and in this method the reaction mixture may be agitated or may remain stationary. Good yields, however, are also obtained without these special measures provided care is taken that strong local overheating is avoided.

Since the reaction mixtures tend to cake, it is often advantageous to perform the process in the presence of inert liquid or solid additives which are adapted to prevent the caking and improve the gas-permeability of the reaction mixture. Such additives are, for example, sand, pumice stone powder, metal powder, kieselguhr, activated charcoal, aluminum oxide, or inert salts such as sodium sulfate. In place of these solid inert materials, inert, liquids may be used provided they do not decompose under the prevailing conditions. Aromatic hydrocarbons may also be added.

The following example will enable persons skilled in the art to better understand and practice the invention and are not intended to be limitative thereto. In the following example conversion was calculated by: 1, calculating the weight of benzoic acid which was equivalent to the weight of the potassium benzoate which was converted to any product; 2, calculating the weight of benzoic acid which was equivalent to the weight of the potassium benzoate charged; 3, dividing the weight of benzoic acid calculated in 1 by the weight of benzoic acid calculated in 2; and 4, multiplying the value calculated in 3 by 100. Efficiency was calculated by determining the weight of potassium terephthalate formed, converting that weight to an equivalent weight of terephthalic acid, dividing that value by the weight of benzoic acid calculated in 1 above, and multiplying the resultant value by 100. Quantities of carboxylates and/or polycarboxylates were calculated by converting the carboxylates and/or polycarboxylates to the respective methyl esters by reaction with methanol and sulfuric acid, and subsequently determining the quantities of the respective methyl esters by gas chromatography in comparison with known authenic standards.

EXAMPLE

A total of 3.2 grams of potassium benzoate, 0.10 gram of potassium phenoxide, varying amounts of potassium carbonate, and 0.10 gram of zinc oxide was charged to each reactor of the runs noted in the table below. CO was pressured to the respective reactors in the amounts noted subsequent to flushing the reactors therewith. CO was pressured at 1000 p.s.i.g. Each reactor had a total volume of 25 cc. Each reactor was then sealed. Temperature was brought to 800° F. and maintained there for 1 hour. All handling of reactants except $H_2O$ prior to the time that the reactors were sealed was done in a dry box. The following results were obtained:

| | Charged | | | Percent | |
|---|---|---|---|---|---|
| Run No.: | $K_2CO_3$ (g.) | CO (g.) | $H_2O$ (g.) | Conversion | Efficiency |
| 1 | 1.60 | 2.56 | 0.064 | 81 | 88 |
| 2 | 1.60 | 2.39 | 0.033 | 73 | 85 |
| 3 | 1.60 | 2.54 | 0.00 | 50 | 81 |
| 4 | 0.40 | 2.55 | 0.06 | 80 | 85 |
| 5 | 0.40 | 2.40 | 0.00 | 44 | 80 |
| 6 | 0.10 | 2.42 | 0.09 | 64 | 68 |
| 7 | 0.10 | 2.57 | 0.00 | 12 | -------- |

The above data clearly demonstrate that an improved system is obtained using the combination of carbon monoxide, catalyst adjuvant and water.

Reasonable variations and modifications of this invention can be made, or followed, in view of the foregoing disclosure, without departing from the spirit or scope thereof.

I claim:
1. In a process for the transformation of an aromatic carboxylic acid to the corresponding aromatic polycarboxylic acid having at least one additional carboxyl group and wherein said transformation is carried out by the heating of an alkali metal salt of said aromatic carboxylic acid of the formula $AR'(COOM)_n$ wherein Ar' is an aromatic hydrocarbon or alkyl aromatic hydrocarbon group having from 6 to 15 carbon atoms therein, M is an alkali metal and $n$ is 1, 2 or 3 at an elevated temperature and pressure in the presence of a catalyst suitable for the transformation of aromatic carboxylic acid salts and wherein the aromatic polycarboxylic acid is recovered from the resulting aromatic polycarboxylic alkali metal salt thereof, the improvement which comprises carrying out said process in an atmosphere consisting essentially of carbon monoxide and in the presence of an adjuvant compound of the formula ROM or ROH wherein R is an alkyl, cycloalkyl or aryl radical or combination thereof having from 1 to 15 carbon atoms therein and M is an alkali metal and from 0.1 to 6 parts of water by weight for each 100 parts of alkali metal aromatic carboxylate.

2. A process according to claim 1 wherein said alkali metal salt of an aromatic carboxylic acid is potassium benzoate.

3. A process according to claim 2 wherein said catalyst is zinc oxide and said adjuvant compound is potassium phenoxide.

4. A process according to claim 1 wherein said adjuvant compound is present in an amount in the range of about 0.001 to 2.0 mols of adjuvant per mol of alkali metal aromatic carboxylate.

References Cited
UNITED STATES PATENTS 3,479,399  11/1969  Nurase et al. _____ 260—515
3,487,106  12/1969  Patton et al. _____ 260—515

JAMES A. PATTEN, Primary Examiner

V. GARNER, Assistant Examiner

U.S. Cl. X.R.
252—428, 429, 430